Patented Dec. 3, 1940

2,223,788

UNITED STATES PATENT OFFICE

2,223,788

REGULATION OF HYDROGEN ION CONCENTRATION BY MEANS OF CALCIUM SALTS OF FERMENTABLE ORGANIC ACIDS

David A. Legg, Terre Haute, and Hugh R. Stiles, St. Mary-of-the-Woods, Ind., assignors to Commercial Solvents Corporation, Terre Haute, Ind., a corporation of Maryland No Drawing. Application August 25, 1937, Serial No. 160,818

11 Claims. (Cl. 195—44)

Our invention relates to an improved method for maintaining the desired hydrogen ion concentration during the butyl alcohol fermentation of sugar mashes. More specifically, our invention relates to a process for maintaining the desired hydrogen ion concentration by means of certain alkaline earth metal salts herein below described.

In the common type of butyl alcohol fermentation which has been commercially utilized in the past, i. e., the fermentation of grain mashes by means of bacteria of the type *Clostridium acetobutylicum* (Weizmann), the bacteria themselves maintain the optimum hydrogen ion concentration throughout the fermentation without the necessity for the use of neutralizing agents. However, there is a different type of butyl alcohol fermentation in which the bacteria are incapable of maintaining suitable hydrogen ion concentration for the production of neutral end products. This group of bacteria may be defined as those capable of producing consistently higher yields of solvents from nutrient glucose mashes than from mashes consisting solely of grain meal and water and which produces increasing amounts of acidic end products throughout the fermentation in the absence of hydrogen ion control. It is shown in co-pending application Ser. No. 115,003 by John Muller, filed December 9, 1936, now Patent No. 2,132,039 issued October 4, 1938, that for optimum solvent production with this type of bacteria the hydrogen ion concentration of the fermenting mash should be controlled during the fermentation, and that this may be effected by incorporating a slight excess of an insoluble neutralizing agent such as calcium carbonate in the initial mash or by adding soluble alkali continuously or semi-continuously during the fermentation.

Although improved results have been secured in fermentations of this type by the use of insoluble neutralizing agents, such as calcium carbonate, there are certain disadvantages inherent in such use. The alkaline earth metal carbonates are extremely insoluble in aqueous media and, therefore, depend for their action upon actual contact of the particles with the acid portions of the mash. However, the natural tendency is for such particles to settle into a more or less dense layer on the bottom of the vessel and to become covered with a layer of slime, thus effectively removing them from their sphere of activity. It has been thought desirable, therefore, to attempt to secure a regulation of the hydrogen ion concentration by means of neutralizing agents more soluble than the alkaline earth metal carbonates. However, up to the present time, all efforts in this direction have failed. The alkalies and strongly alkaline salts can not be added in sufficient quantities at the beginning of the fermentation without adversely effecting the initial hydrogen ion concentration. The use of such materials, therefore, involves continuous or intermittent additions to the mash throughout the fermentation. Such procedures, however, have been found to be undesirable because of the mechanical difficulties involved. It was also attempted to use alkaline earth metal salts of weak acids (other than the carbonates). Materials such as calcium propionate, calcium lactate, calcium citrate, calcium tartrate and calcium borate were employed, but in each case the yield was markedly lowered even though most of the salts are more soluble in aqueous media than calcium carbonate. Up to the present time, therefore, the only satisfactory means for regulating the hydrogen ion concentration of butyl alcohol fermentations has been the use of insoluble materials, such as calcium carbonate.

However, we have now discovered that improved results can be obtained by the use of alkaline earth metal salts of organic acids which are fermentable by the bacteria employed. We have found that in the case of any of the butyl alcohol producing bacteria of the group previously defined, i. e., the essentially sugar fermenting butyl alcohol producing bacteria which normally tend to produce acidic end products, satisfactory yields of neutral end products may be obtained by the use of calcium acetate or calcium butyrate as the sole agent for regulating the hydrogen ion concentration of the mash. The mechanism by which the neutralization is effected is not definitely understood, but it is possible that as the fermentation proceeds the organic acid radical of the salt is utilized by the bacteria and the alkaline earth metal ion forms a carbonate with the carbon dioxide gas being given off from the fermentation. If this hypothesis is correct, it may be seen that the calcium carbonate is formed throughout the mash in the greatest amounts at the height of the fermentation when its neutralizing effect is most needed. It is to be distinctly understood, however, that our invention is not to be limited to any particular theory by which it may operate.

Our invention is applicable to fermentations effected with any butyl alcohol producing bacteria of the class which are capable of producing consistently higher yields of neutral end products from nutrient glucose mashes than from mashes consisting solely of grain meal and water and which produce increasing amounts of acidic end products throughout the fermentation in the absence of hydrogen ion control. Among the numerous bacteria of this class may be mentioned the bacteria of the group Clostridium saccharo acetobutylicum, described in United States Patent No. 2,089,522 of Woodruff et al.; the bacteria of the group Clostridium inverto acetobutylicum, described in United States Patent No. 2,089,562 of Legg et al.; Clostridium saccharo acetobutylicum-beta and Clostridium saccharo acetobutylicum-gamma, described in United States Patent No. 2,050,219 of Arzberger; the bacteria of the group Clostridium propyl butylicum, described in co-pending application U. S. Ser. No. 115,003 of Muller, filed December 9, 1936; now a patent as noted supra, the bacteria of the group Clostridium saccharo-butyl-acetonicum-liquefaciens, described in co-pending application U. S. Ser. No. 124,691 of Arzberger, filed February 8, 1937, now Patent No. 2,139,108 issued Dec. 6, 1938; and Clostridium saccharo - butyl-acetonicum - liquefaciens-gamma and Clostridium saccharo-butyl-acetonicum-liquefaciens-delta, described in copending application U. S. Ser. No. 124,686 of Carnarius et al., filed February 8, 1937, now Patent No. 2,139,111 issued Dec. 6, 1938. Our invention is generally applicable to any bacteria of this class, but the essentially starch fermenting bacteria such as Clostridium acetobutylicum (Weizmann) which have been utilized in the past for commercial production of butyl alcohol by fermentation are not in general benefitted by the use of our process.

Our invention may perhaps best be illustrated by the following specific examples:

Example I

A mash was prepared by diluting 350 grams of Louisiana molasses to a volume of approximately 3 liters, adding 7.5 grams of ammonium sulfate and 3 grams of corn germ meal. The particular salt employed as hydrogen ion regulator was then added and the mash sterilized for 30 minutes at 20 lbs. pressure. Duplicate fermentations of the above amount of mash in 4 liter flasks were carried out in each case. The flasks were inoculated with 5% of an active culture of the group Clostridium saccharo acetobutylicum (described in co-pending application U. S. Ser. No. 675,459 by Woodruff et al., now Patent No. 2,089,522 issued August 10, 1937), and incubated at 30° C. The results of these fermentations are given in the table below:

Table 1

| Salt employed as hydrogen ion regulator | Concentration of salt, gms./liter | Final pH of mash | Yield percent calculated on sugar | Solvent ratio | | |
|---|---|---|---|---|---|---|
| | | | | Butyl alcohol, percent | Acetone, percent | Ethyl alcohol, percent |
| Calcium carbonate | 2.6 | 5.76 | 33.3 | 70.7 | 26.6 | 2.7 |
| Calcium acetate | 3.1 | 5.76 | 34.1 | 66.2 | 29.3 | 4.5 |
| Calcium butyrate | 3.9 | 5.78 | 35.2 | 64.1 | 31.6 | 4.3 |

Example II

A mash was prepared by diluting 311 grams of Cuban molasses to approximately 3 liters and adding 7.5 grams of ammonium sulfate and 3 grams of corn germ meal. The particular salt employed as hydrogen ion regulator was then added and the mash sterilized for 30 minutes at 20 lbs. pressure. Duplicate fermentations of the above amount of mash were carried out in each case in 4 liter flasks. The flasks were inoculated with 5% of an active culture of Clostridium saccharo acetobutylicum-alpha (described in co-pending application Ser. No. 675,459 by Woodruff et al., now Patent No. 2,089,522, issued August 10, 1937), and incubated at 30° C. The results of these fermentations are given in the table below:

Table 2

| Salt employed as hydrogen ion regulator | Concentration of salt, gms./liter | Final pH of mash | Yield percent calculated on sugar | Solvent ratio | | |
|---|---|---|---|---|---|---|
| | | | | Butyl alcohol, percent | Acetone, percent | Ethyl alcohol, percent |
| Calcium carbonate | 2.3 | 5.70 | 32.4 | 71.2 | 25.5 | 3.3 |
| Calcium acetate | 3.7 | 5.80 | 34.0 | 66.9 | 29.1 | 4.0 |
| Calcium butyrate | 5.1 | 5.83 | 35.4 | 68.2 | 30.0 | 1.8 |

It will be noted from the above results that when calcium acetate or calcium butyrate was employed in the amounts specified the final pH of the mash fell within the optimum range for organisms of the Clostridium saccharo-acetobutylicum group (pH 5.5–6.1) and that the yields in each case were better than when calcium carbonate was employed. It may also be seen that the ratio of solvents was somewhat changed which, under certain market conditions, would be a distinct advantage.

Example III

A mash was prepared by diluting Cuban molasses to a sugar concentration of approximately 60 grams per liter and adding approximately 3 grams per liter of ammonium sulfate and 7.5 grams per liter of calcium acetate. This mash was inoculated with an active culture of bacteria of the group Clostridium saccharo-butyl-acetonicum-liquefaciens and incubated at 30° C. At the conclusion of the fermentation, the final pH was found to be 6.0 and the solvent yield was found to be 35.0%, based on the weight of the sugar in the mash.

Example IV

A mash was prepared by diluting Cuban molasses to a sugar concentration of approximately 68 grams of liter with water and sufficient grain alcohol distillery slop so that the latter was present in the mash in a concentration of approximately 20% by volume. Approximately 3 grams per liter of ammonium sulfate and 7.5 grams per liter of calcium butyrate were added and the mash was inoculated with an active culture of *Clostridium saccharo-butyl-acetonicum-liquefaciens-gamma*. The mash was incubated at 30° C., and at the conclusion of the fermentation the final pH was found to be 5.9 and the solvent yield was found to be 34.3%, based on the weight of the sugar in the mash.

When employing alkaline earth metal salts of the type specified above, the concentrations of these salts may be approximately equivalent to the amounts of calcium carbonate previously employed in such fermentations. Amounts of salts equivalent to from 3 to 13%, or preferably 5 to 8%, of calcium carbonate calculated on the weight of the sugar in the mash will be found to be suitable in most cases. The amount to be employed with any particular bacteria or group of bacteria will, of course, fall within a somewhat narrower range. Thus in the case of bacteria of the *Clostridium propyl butylicum*, *Clostridium inverto-acetobutylicum*, and *Clostridium saccharo-acetobutylicum* groups amounts of salts equivalent to 3–10%, or preferably 5–6% of calcium carbonate will usually be found to be satisfactory.

The amount of salt which is preferred to be used is that which will result in a final hydrogen ion concentration within the operative range for the bacteria employed. Satisfactory results will usually be obtained with any of the bacteria of the group previously defined by employing a quantity of calcium acetate or calcium butyrate sufficient to give rise to a final hydrogen ion concentration falling within the range pH 5.0 to pH 6.5. However, for each particular organism best results will be secured by utilizing an amount of the material sufficient to give rise to a final pH within the optimum range for that organism. For example, in the case of *Clostridium propyl butylicum*, the final pH should be preferably be within the range 5.8–6.1; in the case of *Clostridium inverto-acetobutylicum*, within the range 5.7–6.1; and in the case of *Clostridium saccharo-acetobutylicum*, within the range 5.5–5.85. It will be apparent that one skilled in the art may readily determine the optimum amount to be employed in any particular case by simple preliminary experiments.

It is to be understood, of course, that our invention is not limited to any of the specific examples given above. Although the invention is illustrated in connection with fermentations by means of bacteria of the groups *Clostridium saccharo acetobutylicum* and *Clostridium saccharo-butyl-acetonicum-liquefaciens*, it is applicable to fermentations by means of any other butyl alcohol producing bacteria of the class which are capable of producing consistently higher yields of solvents from nutrient glucose mashes and from mashes consisting solely of grain meal and water and which produce increasing amounts of acidic end products throughout the fermentation in the absence of hydrogen ion control. It is to be understood that this group of bacteria includes not only the various specific types previously mentioned, but also any newly isolated bacteria having these characteristics or any of the numerous prior art bacteria having these characteristics, such as certain members of the *Clostridium butyricum* group which have been variously designated in the literature. Likewise, the invention is not limited to the use of calcium acetate or calcium butyrate as the hydrogen ion regulators. Any alkaline earth metal salt of an organic acid which is fermentable by the bacteria employed may be successfully used. Certain modifications of the procedure will be obvious to those skilled in the art. For example, if desired, the regulation of the hydrogen ion concentration may be effected by a combination of calcium carbonate and a calcium salt of an organic acid which is fermentable by the bacteria employed. In general, it may be said that any modifications in the process or the use of any equivalents which would naturally occur to one skilled in the art are included within the scope of our invention.

This application is a continuation-in-part of our application U. S. Ser. No. 691,890, filed October 2, 1933.

Our invention now having been described, what we claim is:

1. In a process for the production of normal butyl alcohol and other neutral products by the fermentation of nutrient sugar mashes by means of butyl alcohol producing bacteria of the class which are capable of producing consistently higher yields of neutral end products from a nutrient glucose mash than from a mash consisting solely of grain meal and water and which produce increasing amounts of acidic end products throughout the fermentation in the absence of hydrogen ion control, the improvement which comprises regulating the hydrogen ion concentration of the mash by means of a salt chosen from the group consisting of alkaline earth metal acetates and butyrates, whereby the final hydrogen ion concentration secured by the action of the bacteria falls within the range pH 5.0 to pH 6.5.

2. In a process for the production of normal butyl alcohol and other neutral products by the fermentation of nutrient sugar mashes by means of butyl alcohol producing bacteria of the class which are capable of producing consistently higher yields of neutral end products from a nutrient glucose mash than from a mash consisting solely of grain meal and water and which produce increasing amounts of acidic end products throughout the fermentation in the absence of hydrogen ion control, the improvement which comprises regulating the hydrogen ion concentration of the mash by means of a salt chosen from the group consisting of calcium acetate and calcium butyrate whereby the final hydrogen ion concentration secured by the action of the bacteria falls within the range pH 5.0 to pH 6.5.

3. In a process for the production of normal butyl alcohol and other neutral products by the fermentation of nutrient sugar mashes by means of butyl alcohol producing bacteria of the class which are capable of producing consistently higher yields of neutral end products from a nutrient glucose mash than from a mash consisting solely of grain meal and water and which produce increasing amounts of acidic end products throughout the fermentation in the absence of hydrogen ion control, the improvement which comprises effecting the fermentation in the presence of a salt chosen from the group consisting of alkaline earth metal acetates and butyrates, said salt being present initially in a concentration equivalent to about 3% to about 13% of calcium carbonate calculated on the weight of the sugar in the mash.

4. In a process for the production of normal butyl alcohol and other neutral products by the fermentation of nutrient sugar mashes by means of butyl alcohol producing bacteria of the class which are capable of producing consistently higher yields of neutral end products from a nutrient glucose mash than from a mash consisting solely of grain meal and water and which produce increasing amounts of acidic end products throughout the fermentation in the absence of hydrogen ion control, the improvement which comprises effecting said fermentation in the presence of a salt chosen from the group consisting of calcium acetate and calcium butyrate, said salt being present initially in a concentration equivalent to about 5% to about 8% of calcium carbonate, calculated on the weight of the sugar in the mash.

5. In a process for the production of normal butyl alcohol and other products by the fermentation of nutrient sugar mash by means of bacteria of the class consisting of the groups *Clostridium propyl butylicum, Clostridium inverto acetobutylicum* and *Clostridium saccharo acetobutylicum,* the improvement which comprises regulating the hydrogen ion concentration of the mash by means of a salt chosen from the group consisting of calcium acetate and calcium butyrate whereby the final hydrogen ion concentration secured by the action of the bacteria falls within the range pH 5.5—6.1.

6. In a process for the production of normal butyl alcohol and other products by the fermentation of nutrient sugar mash by means of bacteria of the group *Clostridium saccharo acetobutylicum,* the improvement which comprises regulating the hydrogen ion concentration of the mash by means of a salt chosen from the group consisting of alkaline earth metal acetates and butyrates whereby the final hydrogen ion concentration secured by the action of the bacteria falls within the range pH 5.5—5.85.

7. In a process for the production of normal butyl alcohol and other products by the fermentation of nutrient sugar mash by means of bacteria of the group *Clostridium inverto acetobutylicum,* the improvement which comprises regulating the hydrogen ion concentration of the mash by means of a salt chosen from the group consisting of alkaline earth metal acetates and butyrates whereby the final hydrogen ion concentration secured by the action of the bacteria falls within the range pH 5.7—6.1.

8. In a process for the production of normal butyl alcohol and other products by the fermentation of nutrient sugar mashes by means of bacteria of the group *Clostridium propyl butylicum,* the improvement which comprises regulating the hydrogen ion concentration of the mash by means of a salt chosen from the group consisting of alkaline earth metal acetates and butyrates whereby the final hydrogen ion concentration secured by the action of the bacteria falls within the range pH 5.8—6.1.

9. In a process for the production of normal butyl alcohol and other products by the fermentation of nutrient sugar mash by means of bacteria of the class consisting of the groups *Clostridium propyl butylicum, Clostridium inverto acetobutylicum,* and *Clostridium saccharo acetobutylicum,* the improvement which comprises carrying out said fermentation in the presence of a salt chosen from the group consisting of alkaline earth metal acetates and butyrates, said salt being present initially in a concentration equivalent to about 3% to about 10% of calcium carbonate calculated on the weight of the sugar in the mash.

10. In a process for the production of normal butyl alcohol and other products by the fermentation of nutrient sugar mash by means of bacteria of the class consisting of the groups *Clostridium propyl butylicum, Clostridium inverto acetobutylicum,* and *Clostridium saccharo acetobutylicum,* the improvement which comprises carrying out said fermentation in the presence of a salt chosen from the group consisting of alkaline earth metal acetates and butyrates, said salt being present initially in a concentration equivalent to about 5% to about 6% of calcium carbonate calculated on the weight of the sugar in the mash.

11. In a process for the production of normal butyl alcohol and other products by the fermentation of nutrient sugar mash by means of bacteria of the class consisting of the groups *Clostridium propyl butylicum, Clostridium inverto acetobutylicum,* and *Clostridium saccharo acetobutylicum,* the improvement which comprises carrying out said fermentation in the presence of a salt chosen from the group consisting of calcium acetate and calcium butyrate, said salt being present initially in a concentration equivalent to about 5% to 6% of calcium carbonate calculated on the weight of the sugar in the mash.

DAVID A. LEGG.
HUGH R. STILES.